United States Patent
Abou Mahmoud et al.

(10) Patent No.: US 10,050,915 B2
(45) Date of Patent: Aug. 14, 2018

(54) ADDING IMAGES TO A TEXT BASED ELECTRONIC MESSAGE

(71) Applicant: International Business Machines Corporation, Armonk, NY (US)

(72) Inventors: Alaa Abou Mahmoud, Dracut, MA (US); Paul R. Bastide, Boxford, MA (US); Fang Lu, Billerica, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 228 days.

(21) Appl. No.: 14/857,729

(22) Filed: Sep. 17, 2015

(65) Prior Publication Data

US 2017/0085507 A1 Mar. 23, 2017

(51) Int. Cl.
*G06F 15/16* (2006.01)
*H04L 12/58* (2006.01)

(52) U.S. Cl.
CPC ............ *H04L 51/10* (2013.01); *H04L 51/063* (2013.01)

(58) Field of Classification Search
CPC .............................. H04L 51/10; H04L 51/063
See application file for complete search history.

(56) References Cited

U.S. PATENT DOCUMENTS

| | | | |
|---|---|---|---|
| 5,305,208 A | 4/1994 | Doi et al. | |
| 6,546,390 B1 | 4/2003 | Pollack et al. | |
| 7,117,192 B2 | 10/2006 | Waltz et al. | |
| 2001/0030710 A1 | 10/2001 | Werner | |
| 2006/0103871 A1 | 5/2006 | Weinans | |
| 2008/0256441 A1* | 10/2008 | New | H04L 51/04 715/256 |
| 2009/0138791 A1* | 5/2009 | Kamada | G06F 17/2836 715/230 |
| 2009/0210778 A1 | 8/2009 | Kulas et al. | |
| 2010/0030549 A1* | 2/2010 | Lee | G06F 1/1626 704/4 |
| 2010/0179991 A1* | 7/2010 | Lorch | H04L 51/10 709/206 |
| 2012/0157134 A1* | 6/2012 | Lee | H04L 12/583 455/466 |
| 2012/0158494 A1 | 6/2012 | Reis et al. | |
| 2013/0204940 A1 | 8/2013 | Kinsel et al. | |
| 2014/0129558 A1 | 5/2014 | Estes | |

(Continued)

OTHER PUBLICATIONS

Barnard, K. et al., "Learning the Semantics of Words and Pictures," In Proc. of 8th IEEE Int'l. Conf. on Computer Vision, ICCV 2001, vol. 2, pp. 408-415, IEEE, 2001.

(Continued)

*Primary Examiner* — Richard G Keehn
(74) *Attorney, Agent, or Firm* — Cuenot, Forsythe & Kim, LLC

(57) ABSTRACT

A plurality of word groups that satisfy at least one criterion, each word group comprising at least one word, can be identified in an electronic message. For each word group that satisfies the at least one criterion, at least a first image corresponding to a meaning of the word group can be automatically selected from a plurality of images. Each image selected for each respective word group that satisfies the at least one criterion can be presented with the electronic message.

20 Claims, 4 Drawing Sheets

(56) References Cited

U.S. PATENT DOCUMENTS

| | | | | |
|---|---|---|---|---|
| 2014/0161356 A1* | 6/2014 | Tesch | ............... | H04L 51/063 |
| | | | | 382/196 |
| 2014/0163957 A1* | 6/2014 | Tesch | ............... | H04L 51/063 |
| | | | | 704/9 |
| 2014/0164507 A1* | 6/2014 | Tesch | ............... | H04L 51/10 |
| | | | | 709/204 |
| 2015/0055155 A1* | 2/2015 | Amano | ............... | G06F 3/1222 |
| | | | | 358/1.11 |
| 2015/0356603 A1* | 12/2015 | Tung | ............... | H04W 4/18 |
| | | | | 705/14.55 |

OTHER PUBLICATIONS

Al Masum, S.M. et al., "'Auto-Presentation': a Multi-Agent System for Building Automatic Multi-Modal Presentation of a Topic from World Wide Web Information," In IEEE/WIC/ACM Int'l. Conf. ib Intelligent Agent Technology, pp. 246-249, IEEE, 2005.

Christodoulakis, S. et al., "Multimedia Document Presentation, Information Extraction, and Document Formation in MINOS: a Model and a System," In ACM Transactions on Information Systems (TOIS) 4, No. 4, pp. 345-383, 1986.

Sampath, H. et al., "Role of Technology in Assisting Children with Developmental Disorders," Special Interest Group on Artificial Intelligence (SIGAI) Workshop on Emerging Research trends in Artificial Intelligence (ERTAI-2010), Apr. 2010, 4 pg.

\* cited by examiner

600

Identify in an electronic message a plurality of word groups that satisfy at least one criterion, each word group comprising at least one word
605

For each word group that satisfies the at least one criterion, automatically select, using a processor, from a plurality of images at least a first image corresponding to a meaning of the word group
610

Presenting with the electronic message each image selected for each respective word group that satisfies the at least one criterion
615

Network Adapter 730

System Bus 715

Processor 705

Local Memory 720

Bulk Storage Device 725

Memory Elements 710

Operating System 735

Image Selection Application 514

FIG. 7

ADDING IMAGES TO A TEXT BASED ELECTRONIC MESSAGE

BACKGROUND

The present invention relates to electronic communication and, more specifically, to electronic messages.

Various types of electronic communication used to communicate electronic messages include electronic mail (e-mail), text messaging, instant messaging and posting on websites. The use of these types of electronic messages has grown significantly in recent decades as use of the Internet and mobile devices has grown. Indeed, in many countries communication electronic messages now takes place more frequently than voice communication.

Various communication protocols have been developed to facilitate the communication of electronic messages. Such protocols include the Post Office Protocol (POP), Internet Message Access Protocol (IMAP) and Messaging Application Programming Interface (MAPI), which support e-mail communication. Other protocols commonly used for communication of electronic messages include the Simple Mail Transfer Protocol (SMTP), the Simple Message Protocol (SMP), and the Short Message Service (SMS). Also, websites (e.g., social networking sites, collaboration sites, web forums and blogs) accept electronic messages as posts, and activity streams are used to present multiple posts relevant to a person, group or topic.

SUMMARY

A method includes identifying in a first electronic message a plurality of word groups that satisfy at least one criterion, each word group comprising at least one word. The method also includes, for each word group that satisfies the at least one criterion, automatically selecting, using a processor, from a plurality of images at least a first image corresponding to a meaning of the word group. The method also includes presenting with the first electronic message each image selected for each respective word group that satisfies the at least one criterion.

A system includes a processor programmed to initiate executable operations. The executable operations include identifying in a first electronic message a plurality of word groups that satisfy at least one criterion, each word group comprising at least one word. The executable operations also include, for each word group that satisfies the at least one criterion, automatically selecting from a plurality of images at least a first image corresponding to a meaning of the word group. The executable operations also include presenting with the first electronic message each image selected for each respective word group that satisfies the at least one criterion.

A computer program includes a computer readable storage medium having program code stored thereon. The program code is executable by a processor to perform a method. The method includes identifying, by the processor, in a first electronic message a plurality of word groups that satisfy at least one criterion, each word group comprising at least one word. The method also includes, for each word group that satisfies the at least one criterion, automatically selecting, by the processor, from a plurality of images at least a first image corresponding to a meaning of the word group. The method also includes presenting, by the processor, with the first electronic message each image selected for each respective word group that satisfies the at least one criterion.

BRIEF DESCRIPTION OF THE DRAWINGS

FIG. 6 is a flow chart illustrating an example of a method of presenting with electronic messages images selected for respective word groups contained in the electronic messages.

FIG. 7 is a block diagram illustrating example architecture for a processing system.

DETAILED DESCRIPTION

Figure 1:
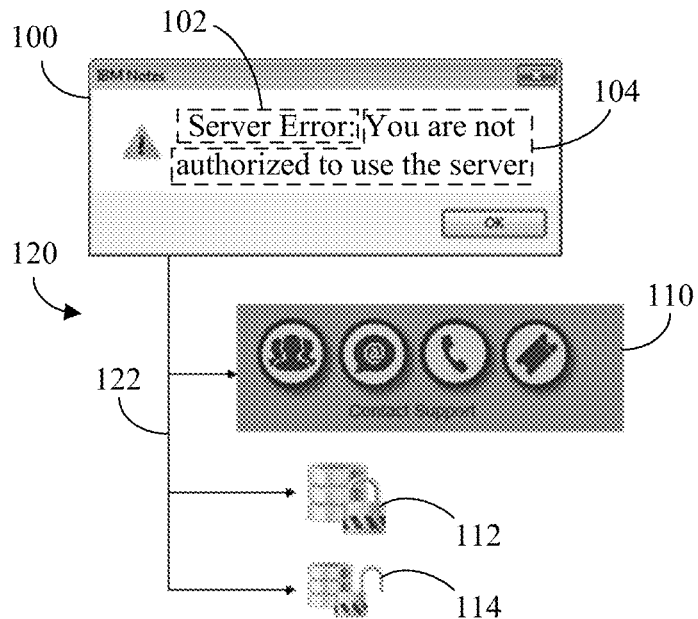
FIG. 1 depicts an example of an electronic message and a plurality of images associated with the electronic message.

The present invention relates to electronic communication and, more specifically, to electronic messages. In accordance with the inventive arrangements disclosed herein, one or more word groups that satisfy at least one criterion can be identified in an electronic message (e.g., an e-mail, a text message, an instant message or a post to a blog, forum, social networking system, collaboration system or the like). Each word group can include one or more words. For each word group that satisfies the at least one criterion, at least one image that corresponds to a meaning of the word group can be selected. The image(s) selected can be presented with the electronic message, for example responsive to a user accessing and viewing the electronic message. Accordingly, rather than reading the text of the electronic message, a user can view the image(s) to gain a quick understanding of the information contained in the electronic message.

Moreover, the processes described can be applied to a plurality of electronic messages, for example electronic messages presented in an activity stream. Rather than reading the text of each of the electronic messages posted in the activity stream, the user can quickly view one or more images associated with each electronic message to quickly gain an understanding of the various electronic messages. This can save the user a significant amount of time when reviewing multiple electronic messages.

Several definitions that apply throughout this document now will be presented.

As defined herein, the term "image" means a reproduction or imitation of the form of one or more persons or things. Examples of an image include a picture and a drawing. A button, icon or menu item that is user selectable to initiate a method, process or function to be performed by a data processing system is not an "image" as the term "image" is defined herein.

As defined herein, the term "word group" means a human language word, phrase, sentence or paragraph. As defined herein, punctuation (e.g., a group of one or more periods, commas, colons, semicolons, dashes, etc.) and non-letter characters are not "word groups." Nonetheless, a word, phrase, sentence or paragraph may include punctuation and/or non-letter characters.

As defined herein, the term "human language" is a language spoken or written by human beings that is not a computer programming language. A "human language" may be referred to as a "natural language."

As defined herein, the term "electronic message" means a message that includes text and which is communicated electronically for presentation to at least one user. Examples of an "electronic message" include an e-mail, a text message, and an instant message. A further example of an "electronic message" includes a post to a blog, forum, social networking system, collaboration system or the like. An "electronic message" may, but need not, include pictures, images, multimedia, hyperlinks, and the like.

As defined herein, the term "activity stream" means a list of electronic messages, each of which are relevant to a person, group and/or topic.

As defined herein, the term "social networking system" means a system that supports communication between members of a social network. Examples of a social networking system include an Internet forum, a blog, and a social networking site. As defined herein, an "e-mail system," per se, is not a social networking system. As defined herein, an "e-mail server," per se, is not a social networking system. As defined herein, an "e-mail client," per se, is not a social networking system.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "automatically" means without user intervention.

As defined herein, the term "user" means a person (i.e., a human being).

FIG. 1 depicts an example of an electronic message 100 and a plurality of images 110, 112, 114 associated with the electronic message 100 in accordance with the present arrangements. The electronic message 100 can be presented on a client device to a user. In this example, the electronic message 100 includes a plurality of word groups 102, 104. The word group 102 can be a main topic (e.g., "Server Error") and the word group 104 can be a comment (e.g., "You are not authorized to use the server"). The message can be processed by a data processing system (hereinafter "processing system") executing an image selection application, as will be described herein, to automatically identify the word groups 102, 104, each including at least one word, in the electronic message 100 which satisfy at least one criterion. Examples of a criterion include, but are not limited to, a topic, a tag, a word type, a relevancy, a user interest, an alert, a condition, an instruction to a user, an action to be taken, an action that has been taken, and the like.

The processing system also can automatically determine the meaning of each word group 102, 104. To determine the meaning of each word group 102, 104, the processing system can implement natural language processing (NLP) and semantic analysis on each word group. NLP is a field of computer science, artificial intelligence and linguistics which implements computer processes to facilitate interactions between computer systems and human (natural) languages. NLP enables computers to derive computer-understandable meaning from natural language input. The International Organization for Standardization (ISO) publishes standards for NLP, one such standard being ISO/TC37/SC4. Semantic analysis is the implementation of computer processes to generate computer-understandable representations of natural language expressions. Semantic analysis can be used to construct meaning representations, semantic underspecification, anaphora resolution, presupposition projection and quantifier scope resolution, which are known in the art. Semantic analysis is frequently used with NLP to derive computer-understandable meaning from natural language input.

Having determined the meaning of each word group 102, 104 the processing system can automatically select one or more images 110-114 corresponding to such meanings and present the selected images 110-114 with the electronic message 100. For instance, the processing system can select the images 110-114 from an image database. The image database can include a plurality of images and, for each image, metadata. The processing system can scan the metadata to identify metadata that correlates to the determined meanings of the word groups 102, 104, and select the images to which such metadata is assigned or otherwise associated.

In illustration, the processing system can select the image 110, which corresponds to the meaning of the word group 102 (e.g., the main topic). In this example, since there is a server error, the user should contact support. Thus, the image 110 that is selected can be an image that indicates such. The processing system also can select the images 112, 114 to correspond to the word group 104 (e.g., the comment). For example, since the user is not authorized to use the server, the server may be locked for that user. Accordingly, the image 112 that is selected can indicate this condition. Further, in order for the user to use the server, the server may need to be unlocked for the user, as indicated by the selected image 114. By viewing the images 110-114, the user can easily glean a meaning of the electronic message 100.

The images 110-114 can be presented to the user with the electronic message 100 in a suitable manner. For instance, in one arrangement, the images can be presented in a tree structure 120 that presents the selected images 110-114 below the electronic message 100, thereby indicating that the images 110-114 correspond to the electronic message 100. In one arrangement, the tree structure 120 can include lines 122 pointing from the electronic message 100 to the images 110-114, for example as shown. In this regard, the tree structure 120 can represent and/or indicate a hierarchical relationship between the electronic message 100 and the images 110-114 (e.g., indicate that the images 110-114 have been selected for the electronic message 100, but were not originally included in the electronic message 100 when the electronic message 100 was created). Thus, the user will be aware of such circumstance.

Figure 2:
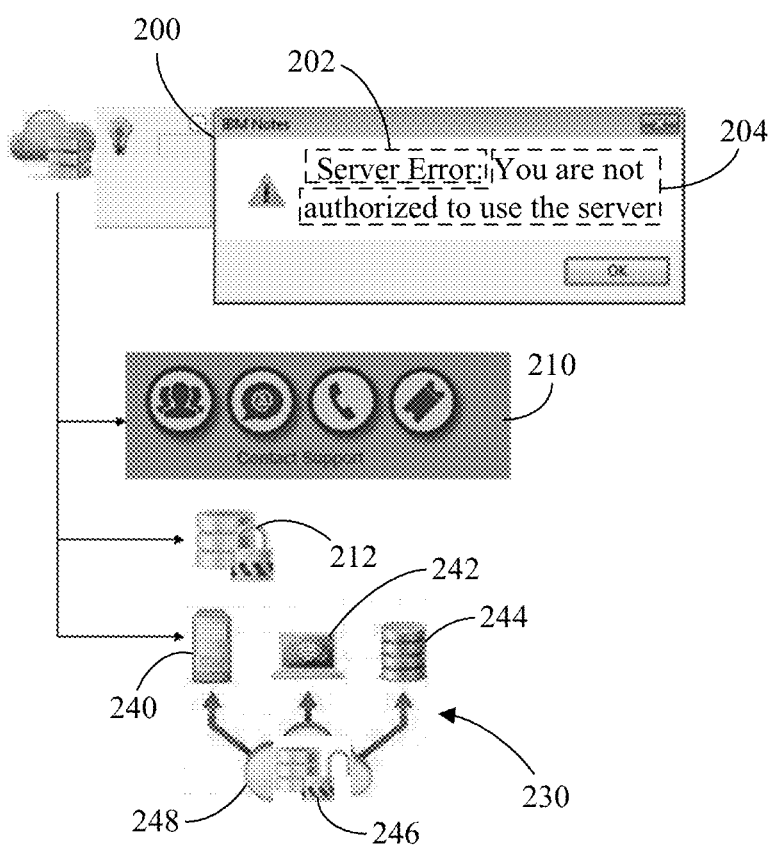
FIG. 2 depicts another example of an electronic message and a plurality of images associated with the electronic message.

FIG. 2 depicts another example of an electronic message 200 and a plurality of images 210, 212, 214 associated with the electronic message 200 in accordance with the present arrangements. The electronic message 200 can be presented on a client device to a user. The images 210, 212 can be selected to correspond to the meanings of the respective word groups 202, 204, as previously described for FIG. 1. In this example, however, a consolidated image 230 also can be presented to the user with the electronic message 200. The consolidated image 214 can be created by the processing system by selecting a plurality (i.e., at least two) images 240, 242, 244, 246, 248 and combining the images 240-248 into the consolidated image 230. In this example, the images 240-248 can pictorially indicate actions that need to be taken to result in the server being unlocked for the user.

To choose the images 240-248 to be used as components of the consolidated image 230, the processing system can, based on the meanings determined for the word groups 202, 204, access a database that correlates actions, results and/or relationships with such meanings In this example, the meaning of the word group 204 can be processed to determine which actions are required to unlock the server for the user, and the processing system can select images 212-244 corresponding to such actions. The processing system also can select an image 246 representing the result of the server being unlocked, and select an image 248 to show the relationship of the result to the actions. The processing system can piece together the selected images 240-248, for example by placing in the consolidated image 230, in order, each of the images 240-244 representing actions to be taken, placing near the images 240-244 (e.g., below) the image 246 representing the desired result, and placing the image 248 to show the relationship of the result to the actions. Thus, in this example, a user viewing the images 210, 214, 230 will easily comprehend, merely by viewing the images 210, 214, 230, that the user should contact support because the server is locked and actions need to be taken by support to unlock the server.

Figure 3:
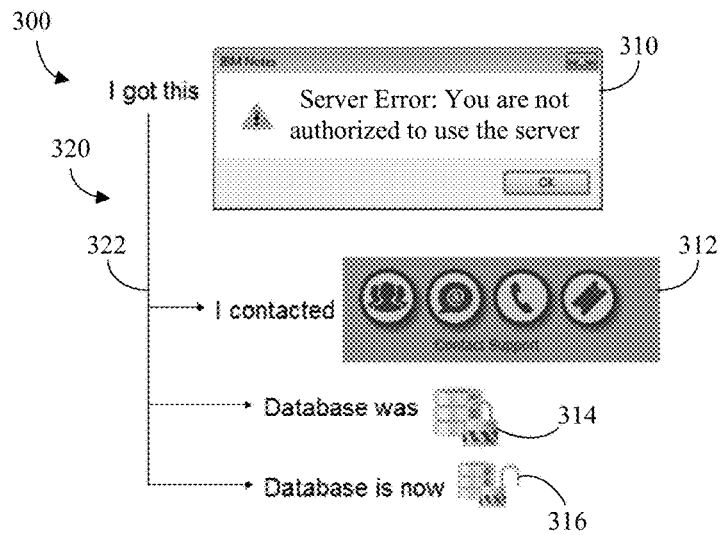
FIG. 3 depicts another example of an electronic message in which word groups are replaced with corresponding images.

FIG. 3 depicts another example of an electronic message 300 in which word groups are replaced with corresponding images in accordance with the present arrangements. The electronic message 300 can be presented on a client device to a user. In this example, a user can create the electronic message 300, and the processing system can replace one or more words of word groups in the electronic message 300 with images. In illustration, the user can create an electronic message that includes the text "I got this message indicating 'Server Error: You are not authorized to use the server'. I contacted support. Database was locked. Database is now unlocked."

The processing system can identify the meaning of the word groups "I got this message indicating 'Server Error: You are not authorized to use the server'" and, based on the meaning, select an image 310 representing the meaning of the words "message indicating 'Server Error: You are not authorized to use the server'." The processing system can replace the words "message indicating 'Server Error: You are not authorized to use the server'" with the image 310 and replace those words with the image 310. Further, the processing system can identify the meaning of the word group "I contacted support" and, based on the meaning, select an image 312 representing the meaning of the words "support." The processing system can replace the word "support" with the image 312. The process can continue for the word groups "Database was locked" and "Database is now unlocked" to replace the word "locked" with an image 314 and replace the word "unlocked" with an image 316.

In one arrangement, the processing system can position each word group in a separate line, and insert the images 310-316 in the respective lines. Further, the processing system can present the remaining text and the images 310-316 in a tree structure 320. For example, the processing system can identify one of the word groups, for example "I got this message indicating 'Server Error: You are not authorized to use the server'," as a main topic. The processing system can present the text "I got this" and the image 310 at the top of the electronic message 300, and present the remaining text and images 312-316, respectively, below the text "I got this" and image 310, for example as shown in FIG. 3, to indicate a hierarchical relationship between the main topic and the other comments. In one arrangement, the tree structure 320 can include lines 322 pointing from the main topic text "I got this" to the text "I contacted," "Database was" and "Database is now," for example as shown. This arrangement can help a user viewing the electronic message 300 comprehend the electronic message 300 quickly upon viewing the electronic message 300.

Figure 4:
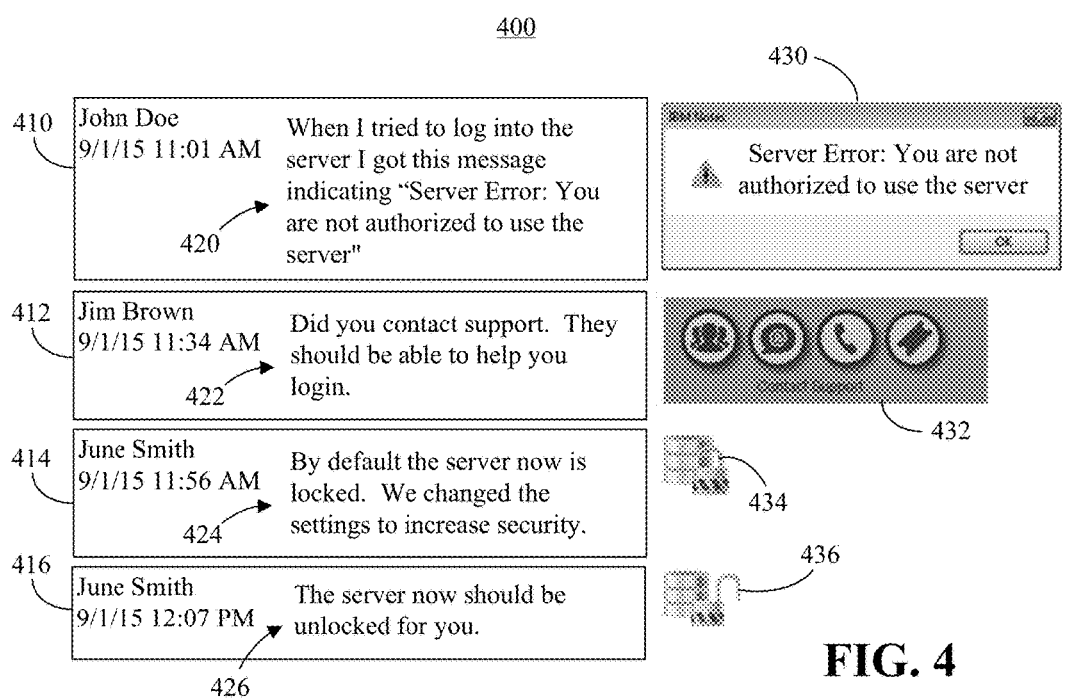
FIG. 4 depicts example of an activity stream in which a plurality of electronic messages and images associated with the electronic messages are presented.

FIG. 4 depicts example of an activity stream 400 in which a plurality of electronic messages and images associated with the electronic messages are presented in accordance with the present arrangements. The activity stream 400 can be presented on a client device to a user. The activity stream 400 can include a plurality of electronic messages 410, 412, 414, 416, each of which includes one or more word groups 420, 422, 424, 426. The processing system can determine the meaning of each of the word group 420-426 and, based on their meanings, select at least one image corresponding to at least one word group 420-426 in each electronic message 410-416. In illustration, the processing system can select an image 430 corresponding to the meaning of the word group 420, an image 432 corresponding to the meaning of the word group(s) 422, an image 434 corresponding to the meaning of the word group(s) 424, and an image 436 corresponding to the meaning of the word group(s) 426. The processing system can present the images 430-436 in the activity stream 400 in a manner that associates each of the images 430-436 with the respective electronic messages 410-416 containing the word groups 420-426 to which the images 430-436 correspond. For example, the image 430 can be presented next to, or below, the electronic message 410, the image 432 can be presented next to, or below, the electronic message 412, the image 434 can be presented next to, or below, the electronic message 414, and the image 436 can be presented next to, or below, the electronic message 416. In another arrangement, the images 430-436 can be presented in the respective electronic messages 410-416. Regardless of where the images 430-436 are presented, a user can view the images to quickly glean a meaning of the electronic messages 410-416 contained in the activity stream 400.

Figure 5:
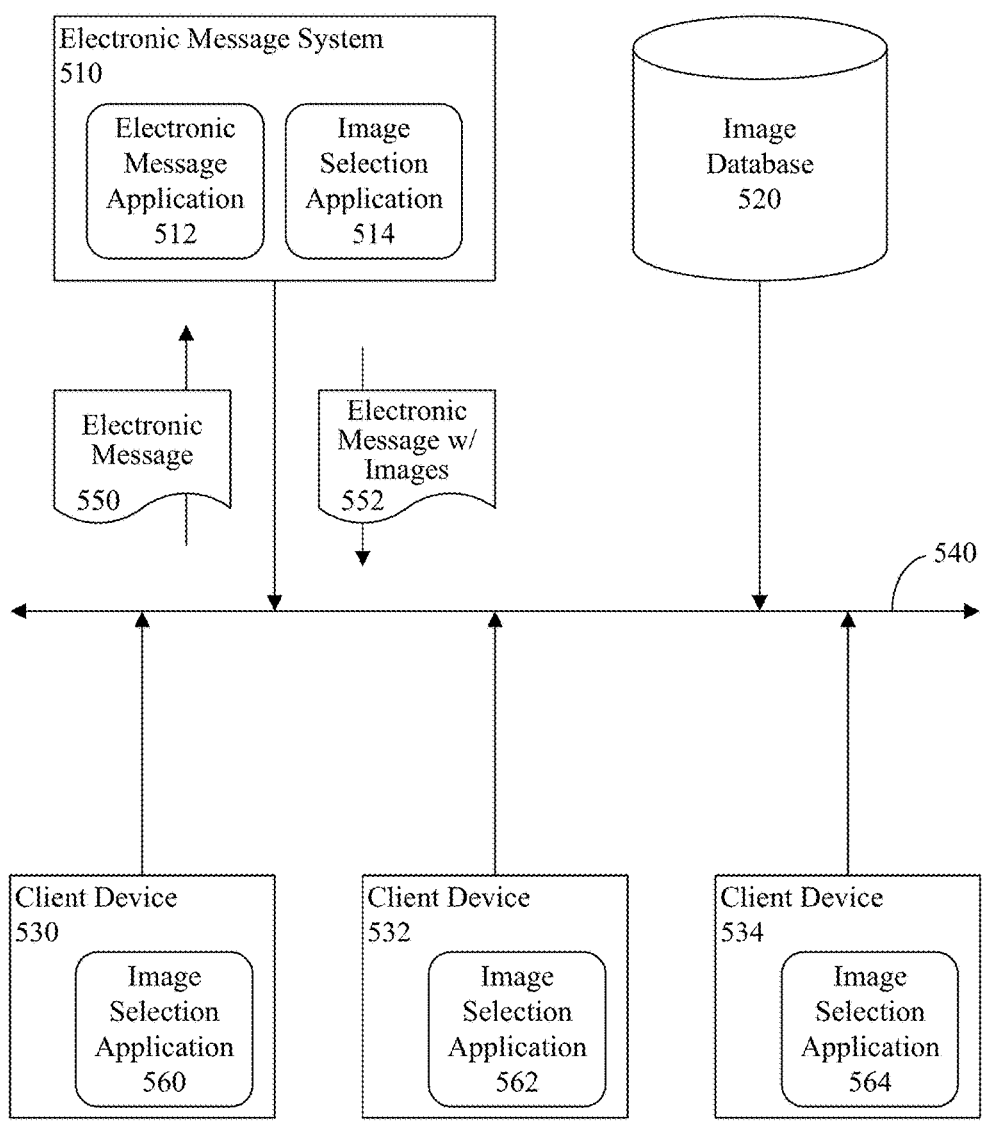
FIG. 5 is a block diagram illustrating an example of a computing environment.

FIG. 5 is a block diagram illustrating an example of a computing environment 500. The computing environment 500 can include the processing previously described. In this example, the processing system can be implemented as an electronic message system 510, which can perform the operations described with respect to FIGS. 1-4 to associate one or more images with electronic messages 550. The computing environment also can include an image database 520 and one or more client devices 530, 532, 534.

The electronic message system 510 can be an e-mail system, an instant messaging system, a text messaging system, a social networking system, a collaboration system, a system hosting a web forum, a system hosting a blog, or the like. In this regard, the electronic message system 510 can include at least one processor and memory configured to receive electronic messages from the client devices 530-534. The electronic message system 510 also can include an electronic message application (or service) 512 executed by the processor(s) and memory to perform electronic messaging processes. Examples of the electronic message application 512 include, but are not limited to, an e-mail server application, a text message server application, an instant message server application, a social networking application, a collaboration application, a web forum hosting application, a blog hosting application, and the like. The electronic message system 510 further can include an image selection application (or module) 514 which, when executed by the electronic message system 510, determines the meaning of word groups contained in electronic messages (e.g., using NLP and semantic analysis), selects images based on those meanings, and presents the images with electronic messages, for example as previously described.

The image database 520 can include a plurality of images. As noted, within the image database 520, metadata can be assigned to, or otherwise associated with, each image. The metadata for each image can indicate a context of the image, image attributes, and any other data pertinent to the image.

Each client device 530-534 can be implemented as a processing system including at least one processor and memory configured to generate electronic messages. Examples of the client devices 530-534 include, but are not limited to, workstations, desktop computers, mobile computers, laptop computers, tablet computers, netbook computers, smart phones, personal digital assistants, set-top boxes, gaming devices, network appliances, and the like. The electronic messages can be generated and communicated to the electronic message system 510 automatically or at the behest of a user. For example, a user can interact with one or more applications executing on a client device 530-534 to generate and send electronic messages. Examples of such applications include, but are not limited to, an e-mail client, a text messing client, an instant messaging client, a mobile application, a web browser, and the like.

Optionally, a server can function as a client device with regard to sending and/or receiving electronic messages that are routed through the electronic message system 510. For instance, a user of a first client device 530 can interact with a server, which in this example can be identified as the client device 534, requesting information from the server. The server can send to the client device 530 an electronic message that is routed through the electronic message system 510.

The client devices 530-534 can be communicatively linked to the electronic message system 510 via one or more networks 540. Via the network(s) 540, the client devices 530-534 can send and receive electronic messages, which may be routed through the electronic message system 510. Similarly, the electronic message system 510 can be communicatively linked to the image database 520 via the network(s) 540. The image database 520, for example, can be stored to a computer-readable storage medium on a server hosting the image database 520. In another arrangement, the image database 520 can be stored to a computer-readable storage medium within or communicatively linked to the electronic message system 510 and hosted by the electronic message system 510.

The network 540 is the medium used to provide communications links between the various client devices 530 and the electronic message system 510 and, optionally, the electronic message system 510 and the image database 520, connected together within the computing environment 500. The network 540 may include connections, such as wire, wireless communication links, or fiber optic cables. The network 540 can be implemented as, or include, any of a variety of different communication technologies such as a wide area network (WAN), a local area network (LAN), a wireless network, a mobile network, a Virtual Private Network (VPN), the Internet, the Public Switched Telephone Network (PSTN), or the like.

In operation, an electronic message 550 can be generated by a client device, for example the client device 530, and communicated to the server. In an arrangement in which the electronic message 550 is an e-mail, text message or instant message, the electronic message can be addressed to a recipient, for example a user of the client device 532. The electronic message system 510 can process the electronic message 550 by associating one or more images with the electronic message 550, for example as previously described, and present the electronic message with the images 552 to the user via the client device 532 (e.g., the electronic message system 510 can communicate the electronic message with the images 552 to the client device, which may display the electronic message with the images 552 to the client device on a display). In an arrangement in which the electronic message 550 is a post to a social network, a collaboration space, a web forum, a blog, or the like, the electronic message system 510 can associate one or more images with the electronic message 550 prior to the electronic message 550 being posted or after the electronic message 550 is posted. In illustration, the electronic message system 510 can associate one or more images with the electronic message 550 in response to presenting the electronic message 550 in an activity stream. In this regard, the electronic message system 510 can associate one or more images with a plurality of electronic messages presented in the activity stream, and present the activity stream to the user via the client device 532.

When selecting images to present with an electronic message 550, the image selection application 514 can identify in the electronic message 550 one or more word groups that satisfy at least one criterion. In one arrangement, the at least one criterion can be user defined or user selectable from a list of criteria. For example, the image selection application 514 can, via a user interface of an application or web browser executed on a client device 530-534, present an electronic message configuration menu. From that menu, the user can define or select at least one criterion for use when processing electronic messages to determine which word groups satisfy the at least one criterion. Via the menu, the user also can specify criteria for the types of images to be presented, desired image attributes for images to be presented (e.g., minimum and/or maximum image size, maximum and/or minimum image file size, etc.). The images selected by the image selection application 514 can be selected based on the user specified criteria. Via the menu, the user also can specify a minimum and/or maximum number of images to present per electronic message, text abbreviation rules, whether to replace words of electronic messages with images, where the images are to be presented relative to the electronic messages, etc. The images presented with the electronic message 550 can be presented according to the user specifications. For example, if the user specifies that a maximum of three images are to be presented with an electronic message 550, the number of images presented with the electronic message can be limited to a maximum of three.

When selecting images to present with an electronic message 550, the image selection application 514 can compare the meaning of one or more word groups contained in the electronic message 550, which meat the at least one criterion, to the context of the images contained in the image database 520. Responsive to the image selection application 514 identifying at least a partial match between a meaning and context of an image, the image selection application 514 can select that image. For example, if the meaning of a word group is determined to be "contact support" and the context of an image is "support," "contact," "contact support," or an acronym or synonym of any of these, the image selection application 514 can identify that image as a candidate for selection. In one aspect, images that are identified as candidates for selection can be limited to those that meet user defined and/or user selected criteria.

If only one candidate for selection is identified, that image can be selected by the image selection application 514. In some cases, however, there may be more than one image identified as having context that is at least a partial match to the meaning of the word group, and thus there may be a plurality of candidates for selection. In such case, the image selection application 514 can assign a value to each candidate image indicating a level of relevance to the meaning. For example, if a determined meaning of a word group is "contact support," the image selection application 514 can assign a first value to the word "contact," a second value to the word "support" and a third value to the word group "contact support." For an image in the image database in which the context contains the word "contact," the image selection application 514 can assign the first value to that image. For an image in the image database in which the context contains the word "support," the image selection application 514 can assign the second value to that image. For an image in the image database in which the context contains the word group "contact support," the image selection application 514 can assign the third value to that image. The image selection application 514 can rank each of the identified images based on the assigned values, and select the image having the highest value to present with a corresponding electronic message 150.

Still, the image selection application 514 can select images from the image database 520 in any other suitable manner and the present arrangements are not limited in this regard. In one arrangement, a plurality of different algorithms embodied as computer program code, including the algorithm described above, can be available to the image selection application 514 for use in selecting images. In such case, a user can be provided an option to choose which algorithm is to be executed to select images, and the user selected algorithm can be executed to select the images.

In one aspect of the present arrangements, in lieu of, or in addition to, the electronic message system 510 including the image selection application 514, one or more of the client devices 530-534 can execute a respective image selection application 560, 562, 564. Accordingly, each of the client devices 530-534 can perform the processes previously described with respect to execution of the image selection application 514 by the electronic message system 510 and described with respect to FIGS. 1-4. As noted, such processes can include identifying word groups in electronic messages 550 that satisfy at least one criterion, automatically selecting images that correspond to the meaning of the word groups, and presenting the selected images with the electronic messages 550 to respective users. The electronic messages 550 can be generated or received by the client devices 530-534. The client devices 530-534 can be communicatively linked to the image database 520 via the network(s) 540.

FIG. 6 is a flow chart illustrating an example of a method 600 of presenting with electronic messages images selected for respective word groups contained in the electronic messages. At step 605, a plurality of word groups that satisfy at least one criterion, each word group comprising at least one word, can be identified in an electronic message. At step 610, for each word group that satisfies the at least one criterion, at least a first image corresponding to a meaning of the word group can be selected, using a processor, from a plurality of images. At step 615, each image selected for each respective word group that satisfies the at least one criterion can be presented with the electronic message. In one arrangement, a plurality of electronic messages can be presented together, for example in an activity stream. In such an arrangement, steps 605-615 can be performed for each of the plurality of electronic messages.

FIG. 7 is a block diagram illustrating example architecture for a processing system 700. The processing system 700 can be, for example, the electronic message system 510 or a client device 530-534 of FIG. 3.

The processing system 700 can include at least one processor 705 (e.g., a central processing unit) coupled to memory elements 710 through a system bus 715 or other suitable circuitry. As such, the processing system 700 can store program code within the memory elements 710. The processor 705 can execute the program code accessed from the memory elements 710 via the system bus 715. It should be appreciated that the processing system 700 can be implemented in the form of any system including a processor and memory that is capable of performing the functions and/or operations described within this specification. For example, the processing system 700 can be implemented as a server, a plurality of communicatively linked servers, a workstation, a desktop computer, a mobile computer, a tablet computer, a laptop computer, a netbook computer, a smart phone, a personal digital assistant, a set-top box, a gaming device, a network appliance, and so on.

The memory elements 710 can include one or more physical memory devices such as, for example, local memory 720 and one or more bulk storage devices 725. Local memory 720 refers to random access memory (RAM) or other non-persistent memory device(s) generally used during actual execution of the program code. The bulk storage device(s) 725 can be implemented as a hard disk drive (HDD), solid state drive (SSD), or other persistent data storage device. The processing system 700 also can include one or more cache memories (not shown) that provide temporary storage of at least some program code in order to reduce the number of times program code must be retrieved from the bulk storage device 725 during execution.

One or more network adapters 730 can be coupled to processing system 700 to enable the processing system 700 to become coupled to other systems, computer systems, remote printers, and/or remote storage devices through intervening private or public networks. Modems, cable modems, transceivers, and Ethernet cards are examples of different types of network adapters 730 that can be used with the processing system 700. Input/output (I/O) devices (not shown), such as a display, touchscreen, keyboard, pointing device, etc. optionally can be coupled to the processing system 700.

As pictured in FIG. 7, the memory elements 710 can store the components of the processing system, namely an operating system 735 and the image selection application 514 (or image selection application 560-564). The image selection application 514 (or image selection application 560-564) can be executed by the processor 705 to implement the processes described herein, including the method 600 of FIG. 6. In an arrangement in which the processing system 700 is the electronic message system 510 of FIG. 3, the memory elements also can store the electronic message application 512 (shown in FIG. 3). In an arrangement in which the processing system 700 is a client device 530-534 of FIG. 3, the memory elements also can store one or more web browsers, electronic messaging clients and/or the like. Being implemented in the form of executable program code, these components of the processing system 700 can be executed by the processing system 700 and, as such, can be considered part of the processing system 700. Moreover, the operating system 735 and the image selection application 514 (or image selection application 560-564), as well as other components, are functional data structures that impart functionality when employed as part of the processing system 700 of FIG. 7.

While the disclosure concludes with claims defining novel features, it is believed that the various features described herein will be better understood from a consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    identifying in a first electronic message a plurality of word groups that satisfy at least one criterion, each word group comprising at least one word;
    for each word group that satisfies the at least one criterion, automatically selecting, using a processor, from a plurality of images at least a first image corresponding to a meaning of the word group; and
    presenting, in a tree structure, the first electronic message in text format and each image selected for each respective word group that satisfies the at least one criterion, the tree structure presenting each selected image below text of the first electronic message and the tree structure indicating that each selected image corresponds to the first electronic message.

2. The method of claim 1, further comprising:
    identifying in each of a plurality of additional electronic messages at least one word group that satisfies the at least one criterion, the first electronic message and the plurality of additional electronic messages contained in an activity stream;
    for each word group of the plurality of additional electronic messages that satisfies the at least one criterion, automatically selecting from the plurality of images at least one additional image corresponding to a meaning of the word group of the additional electronic message; and
    presenting with each of the additional electronic message the respective additional image.

3. The method of claim 1, wherein presenting with the first electronic message each image selected for each respective word group that satisfies the at least one criterion comprises:
    presenting at least one consolidated image comprising at least two images selected from the plurality of images.

4. The method of claim 1, wherein selecting from the plurality of images at least the first image corresponding to a meaning of the word group comprises selecting an image that satisfies at least one user defined or user selected criterion specifying an image type.

5. The method of claim 1, wherein presenting with the first electronic message each image selected for each respective word group that satisfies the at least one criterion comprises presenting with the first electronic message a plurality of the selected images, a total number of the plurality of the selected images presented with the first electronic message satisfying a user specified criteria.

6. The method of claim 1, wherein the criterion is selected from a group of criteria consisting of a topic criteria, a tag criteria, and an alert criteria.

7. The method of claim 1, further comprising:
receiving, via a menu, the at least one criterion from a user, wherein the at least one criterion specifies a type of at least the first image or desired image attributes for the at least one image.

8. A system, comprising:
a processor programmed to initiate executable operations comprising:
identifying in a first electronic message a plurality of word groups that satisfy at least one criterion, each word group comprising at least one word;
for each word group that satisfies the at least one criterion, automatically selecting from a plurality of images at least a first image corresponding to a meaning of the word group; and
presenting, in a tree structure, the first electronic message in text format and each image selected for each respective word group that satisfies the at least one criterion, the tree structure presenting each selected image below text of the first electronic message and the tree structure indicating that each selected image corresponds to the first electronic message.

9. The system of claim 8, the executable operations further comprising:
identifying in each of a plurality of additional electronic messages at least one word group that satisfies the at least one criterion, the first electronic message and the plurality of additional electronic messages contained in an activity stream;
for each word group of the plurality of additional electronic messages that satisfies the at least one criterion, automatically selecting from the plurality of images at least one additional image corresponding to a meaning of the word group of the additional electronic message; and
presenting with each of the additional electronic message the respective additional image.

10. The system of claim 8, wherein presenting with the first electronic message each image selected for each respective word group that satisfies the at least one criterion comprises:
presenting at least one consolidated image comprising at least two images selected from the plurality of images.

11. The system of claim 8, wherein selecting from the plurality of images at least the first image corresponding to a meaning of the word group comprises selecting an image that satisfies at least one user defined or user selected criterion specifying an image type.

12. The system of claim 8, wherein presenting with the first electronic message each image selected for each respective word group that satisfies the at least one criterion comprises presenting with the first electronic message a plurality of the selected images, a total number of the plurality of the selected images presented with the first electronic message satisfying a user specified criteria.

13. The system of claim 8, wherein the criterion is selected from a group of criteria consisting of a topic criteria, a tag criteria, and an alert criteria.

14. The system of claim 8, the executable operations further comprising:
receiving, via a menu, the at least one criterion from a user, wherein the at least one criterion specifies a type of at least the first image or desired image attributes for the at least one image.

15. A computer program product comprising a computer readable storage medium having program code stored thereon, the program code executable by a processor to perform a method comprising:
identifying, by the processor, in a first electronic message a plurality of word groups that satisfy at least one criterion, each word group comprising at least one word;
for each word group that satisfies the at least one criterion, automatically selecting, by the processor, from a plurality of images at least a first image corresponding to a meaning of the word group; and
presenting, by the processor, in a tree structure, the first electronic message in text format and each image selected for each respective word group that satisfies the at least one criterion, the tree structure presenting each selected image below text of the first electronic message and the tree structure indicating that each selected image corresponds to the first electronic message.

16. The computer program product of claim 15, the method further comprising:
identifying in each of a plurality of additional electronic messages at least one word group that satisfies the at least one criterion, the first electronic message and the plurality of additional electronic messages contained in an activity stream;
for each word group of the plurality of additional electronic messages that satisfies the at least one criterion, automatically selecting from the plurality of images at least one additional image corresponding to a meaning of the word group of the additional electronic message; and
presenting with each of the additional electronic message the respective additional image.

17. The computer program product of claim 15, wherein presenting with the first electronic message each image selected for each respective word group that satisfies the at least one criterion comprises:
presenting at least one consolidated image comprising at least two images selected from the plurality of images.

18. The computer program product of claim 15, wherein selecting from the plurality of images at least the first image corresponding to a meaning of the word group comprises selecting an image that satisfies at least one user defined or user selected criterion specifying an image type.

19. The computer program product of claim 15, wherein the criterion is selected from a group of criteria consisting of a topic criteria, a tag criteria, and an alert criteria.

20. The computer program product of claim 15, the method further comprising:
receiving, via a menu, the at least one criterion from a user, wherein the at least one criterion specifies a type of at least the first image or desired image attributes for the at least one image.

* * * * *